United States Patent [19]

Ishida

[11] Patent Number: 5,701,371
[45] Date of Patent: Dec. 23, 1997

[54] TUNABLE OPTICAL FILTER

[75] Inventor: Osamu Ishida, Yokohama, Japan

[73] Assignee: Nippon Telegraph and Telephone Corporation, Tokyo, Japan

[21] Appl. No.: 548,984

[22] Filed: Oct. 27, 1995

[30] Foreign Application Priority Data

Oct. 31, 1994 [JP] Japan ................... 6-267812

[51] Int. Cl.$^6$ ............................... G02B 6/26
[52] U.S. Cl. ................. 385/17; 385/24; 385/16; 359/127
[58] Field of Search ................... 385/17, 15–24; 359/130, 127, 128; 372/20

[56] References Cited

U.S. PATENT DOCUMENTS

| | | | |
|---|---|---|---|
| 5,233,453 | 8/1993 | Sivarajan et al. | 385/16 X |
| 5,341,444 | 8/1994 | Henry et al. | 385/24 X |
| 5,373,517 | 12/1994 | Dragone et al. | 372/20 |
| 5,414,548 | 5/1995 | Tachikawa et al. | 359/130 |
| 5,488,500 | 1/1996 | Glance | 359/130 X |

FOREIGN PATENT DOCUMENTS

| | | | |
|---|---|---|---|
| 0 591 042 A1 | 4/1994 | European Pat. Off. | 385/37 X |
| 0 612 165 A1 | 8/1994 | European Pat. Off. | 385/37 X |

OTHER PUBLICATIONS

O. Ishida et al., FDM–Channel Selection Filter Employing an Arrayed–Waveguide Grating Multiplexer, Electronics Letters, vol. 30, No. 16, pp. 1327–1328, Aug. 4, 1994.

Osamu Ishida et al., Multichannel Frequency–Selective Switch Employing an Arrayed–Waveguide Grating Multiplexer with Fold–Back Optical Paths, IEEE Photonics Technology Letters, vol. 6, No. 10, pp. 1219–1221, Oct. 1994.

S. Suzuki et al., Multichannel Optical Wavelength Selective Switch With Arrayed–Waveguide Grating Multiplexer, Electronics Letters, vol. 30, No. 30, pp. 1091–1092, Jun. 23, 1994.

B. Glance et al., Applications of the Integrated Waveguide Grating Router, 8217 Journal of Lightwave Technology No. 6, pp. 957–961, Jun. 12, 1994.

Ishida et al., "Arrayed–Waveguide Grating Multiplexer with Fold–Back Optical Paths", Lecture Thesis Collection of the Electronic Data Collection Society, Lecture No. SB–8–8, pp. 617–618, 1994 June.

Glance et al., "Applicationa of the Integrated Waveguide Grating Router", Journal of Lightwave Technology, 12 (6):957–962 1994 June.

Primary Examiner—Phan T. H. Palmer
Attorney, Agent, or Firm—Finnegan, Henderson, Farabow, Garrett & Dunner, L.L.P.

[57] ABSTRACT

The tunable optical filter comprises a pair of optical switches and an arrayed-waveguide grating router that has sixteen input waveguides and sixteen output waveguides. The frequency-division-multiplexed optical signal is directed through the first 1×4 optical switch to a selected input waveguide of the router so as to be demultiplexed into output waveguides of the router. The second 1×4 optical switch selects one of four output waveguides of the router so as to obtain a selected optical frequency. By appropriately connecting the switches with the input and output waveguides of the router, sixteen combinations of switch states correspond respectively to sixteen frequencies to be passed by the tunable optical filter. As a result, the filter can be tuned digitally to one of sixteen frequencies with small-size (1×4) optical switches. It is also possible to reduce the loss in the tunable optical filter because the optical signal is only required to make a single passage through the arrayed-waveguide grating router.

3 Claims, 15 Drawing Sheets

FIG. 3

| | 27a (J1) | 27b (J2) | 27c (J3) | 27d (J4) | 27e (J5) | 27f (J6) | 27g (J7) | 27h (J8) | 27i (J9) | 27j (J10) | 27k (J11) | 27l (J12) | 27m (J13) | 27n (J14) | 27o (J15) | 27p (J16) |
|---|---|---|---|---|---|---|---|---|---|---|---|---|---|---|---|---|
| 23a (I1) | $f_{-6}$ | $f_{-5}$ | $f_{-4}$ | $f_{-3}$ | $f_{-2}$ | $f_{-1}$ | $f_0$ | $f_1$ | $f_2$ | $f_3$ | $f_4$ | $f_5$ | $f_6$ | $f_7$ | $f_8$ | $f_9$ |
| 23b (I2) | $f_{-5}$ | $f_{-4}$ | $f_{-3}$ | $f_{-2}$ | $f_{-1}$ | $f_0$ | $f_1$ | $f_2$ | $f_3$ | $f_4$ | $f_5$ | $f_6$ | $f_7$ | $f_8$ | $f_9$ | $f_{10}$ |
| 23c (I3) | $f_{-4}$ | $f_{-3}$ | $f_{-2}$ | $f_{-1}$ | $f_0$ | $f_1$ | $f_2$ | $f_3$ | $f_4$ | $f_5$ | $f_6$ | $f_7$ | $f_8$ | $f_9$ | $f_{10}$ | $f_{11}$ |
| 23d (I4) | $f_{-3}$ | $f_{-2}$ | $f_{-1}$ | $f_0$ | $f_1$ | $f_2$ | $f_3$ | $f_4$ | $f_5$ | $f_6$ | $f_7$ | $f_8$ | $f_9$ | $f_{10}$ | $f_{11}$ | $f_{12}$ |
| 23e (I5) | $f_{-2}$ | $f_{-1}$ | $f_0$ | $f_1$ | $f_2$ | $f_3$ | $f_4$ | $f_5$ | $f_6$ | $f_7$ | $f_8$ | $f_9$ | $f_{10}$ | $f_{11}$ | $f_{12}$ | $f_{13}$ |
| 23f (I6) | $f_{-1}$ | $f_0$ | $f_1$ | $f_2$ | $f_3$ | $f_4$ | $f_5$ | $f_6$ | $f_7$ | $f_8$ | $f_9$ | $f_{10}$ | $f_{11}$ | $f_{12}$ | $f_{13}$ | $f_{14}$ |
| 23g (I7) | $f_0$ | $f_1$ | $f_2$ | $f_3$ | $f_4$ | $f_5$ | $f_6$ | $f_7$ | $f_8$ | $f_9$ | $f_{10}$ | $f_{11}$ | $f_{12}$ | $f_{13}$ | $f_{14}$ | $f_{15}$ |
| 23h (I8) | $f_1$ | $f_2$ | $f_3$ | $f_4$ | $f_5$ | $f_6$ | $f_7$ | $f_8$ | $f_9$ | $f_{10}$ | $f_{11}$ | $f_{12}$ | $f_{13}$ | $f_{14}$ | $f_{15}$ | $f_{16}$ |
| 23i (I9) | $f_2$ | $f_3$ | $f_4$ | $f_5$ | $f_6$ | $f_7$ | $f_8$ | $f_9$ | $f_{10}$ | $f_{11}$ | $f_{12}$ | $f_{13}$ | $f_{14}$ | $f_{15}$ | $f_{16}$ | $f_{17}$ |
| 23j (I10) | $f_3$ | $f_4$ | $f_5$ | $f_6$ | $f_7$ | $f_8$ | $f_9$ | $f_{10}$ | $f_{11}$ | $f_{12}$ | $f_{13}$ | $f_{14}$ | $f_{15}$ | $f_{16}$ | $f_{17}$ | $f_{18}$ |
| 23k (I11) | $f_4$ | $f_5$ | $f_6$ | $f_7$ | $f_8$ | $f_9$ | $f_{10}$ | $f_{11}$ | $f_{12}$ | $f_{13}$ | $f_{14}$ | $f_{15}$ | $f_{16}$ | $f_{17}$ | $f_{18}$ | $f_{19}$ |
| 23l (I12) | $f_5$ | $f_6$ | $f_7$ | $f_8$ | $f_9$ | $f_{10}$ | $f_{11}$ | $f_{12}$ | $f_{13}$ | $f_{14}$ | $f_{15}$ | $f_{16}$ | $f_{17}$ | $f_{18}$ | $f_{19}$ | $f_{20}$ |
| 23m (I13) | $f_6$ | $f_7$ | $f_8$ | $f_9$ | $f_{10}$ | $f_{11}$ | $f_{12}$ | $f_{13}$ | $f_{14}$ | $f_{15}$ | $f_{16}$ | $f_{17}$ | $f_{18}$ | $f_{19}$ | $f_{20}$ | $f_{21}$ |
| 23n (I14) | $f_7$ | $f_8$ | $f_9$ | $f_{10}$ | $f_{11}$ | $f_{12}$ | $f_{13}$ | $f_{14}$ | $f_{15}$ | $f_{16}$ | $f_{17}$ | $f_{18}$ | $f_{19}$ | $f_{20}$ | $f_{21}$ | $f_{22}$ |
| 23o (I15) | $f_8$ | $f_9$ | $f_{10}$ | $f_{11}$ | $f_{12}$ | $f_{13}$ | $f_{14}$ | $f_{15}$ | $f_{16}$ | $f_{17}$ | $f_{18}$ | $f_{19}$ | $f_{20}$ | $f_{21}$ | $f_{22}$ | $f_{23}$ |
| 23p (I16) | $f_9$ | $f_{10}$ | $f_{11}$ | $f_{12}$ | $f_{13}$ | $f_{14}$ | $f_{15}$ | $f_{16}$ | $f_{17}$ | $f_{18}$ | $f_{19}$ | $f_{20}$ | $f_{21}$ | $f_{22}$ | $f_{23}$ | $f_{24}$ |

OUTPUT WAVEGUIDE GROUP

INPUT WAVEGUIDE GROUP

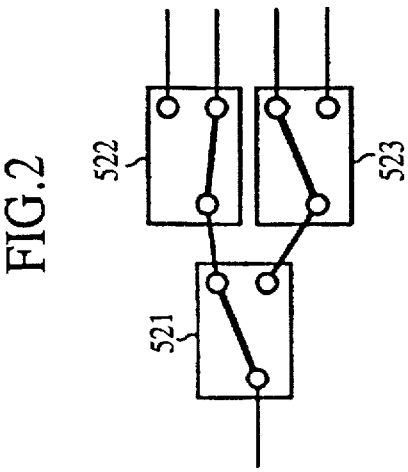

|  | OUTPUT WAVEGUIDE GROUP | | | |
|---|---|---|---|---|
|  | 27c (J3) | 27g (J7) | 27k (J11) | 27o (J15) |
| INPUT WAVEGUIDE GROUP 23f (I6) | $f_1$ | $f_5$ | $f_9$ | $f_{13}$ |
| 23g (I7) | $f_2$ | $f_6$ | $f_{10}$ | $f_{14}$ |
| 23h (I8) | $f_3$ | $f_7$ | $f_{11}$ | $f_{15}$ |
| 23i (I9) | $f_4$ | $f_8$ | $f_{12}$ | $f_{16}$ |

FIG.5

| | n | 1 | 2 | 3 | 4 | ... |
|---|---|---|---|---|---|---|
| NUMBER OF FREQUENCY-DIVISION-MULTIPLEXED CHANNELS (Z) | | 4 | 16 | 64 | 256 | ... |
| NUMBER OF NECESSARY OPTICAL SWITCHES | PRIOR ART | 4 | 16 | 64 | 256 | ... |
| | PRESENT INVENTION | 2 | 6 | 14 | 30 | ... |

| | | OUTPUT WAVEGUIDE GROUP | | | |
|---|---|---|---|---|---|
| | | 27e (J5) | 27g (J7) | 27i (J9) | 27k (J11) |
| INPUT WAVEGUIDE GROUP | 23d (I4) | f1 | f3 | f5 | f7 |
| | 23e (I5) | f2 | f4 | f6 | f8 |
| | 23l (I12) | f9 | f11 | f13 | f15 |
| | 23m (I13) | f10 | f12 | f14 | f16 |

| | | OUTPUT WAVEGUIDE GROUP | | | |
|---|---|---|---|---|---|
| | | 27c (J3) | 27e (J5) | 27k (J11) | 27m (J13) |
| INPUT WAVEGUIDE GROUP | 23f (I6) | f1 | f3 | f9 | f11 |
| | 23g (I7) | f2 | f4 | f10 | f12 |
| | 23j (I10) | f5 | f7 | f13 | f15 |
| | 23k (I11) | f6 | f8 | f14 | f16 |

FIG.8A

|  | OUTPUT WAVEGUIDE GROUP | | | |
|---|---|---|---|---|
|  | 27f (J6) | 27g (J7) | 27h (J8) | 27i (J9) |
| INPUT WAVEGUIDE GROUP | 23c (I3) | f1 | f2 | f3 | f4 |
| | 23g (I7) | f5 | f6 | f7 | f8 |
| | 23k (I11) | f9 | f10 | f11 | f12 |
| | 23o (I15) | f13 | f14 | f15 | f16 |

FIG.8B

|  | OUTPUT WAVEGUIDE GROUP | | | |
|---|---|---|---|---|
|  | 27d (J4) | 27e (J5) | 27l (J12) | 27m (J13) |
| INPUT WAVEGUIDE GROUP | 23e (I5) | f1 | f2 | f9 | f10 |
| | 23g (I7) | f3 | f4 | f11 | f12 |
| | 23i (I9) | f5 | f6 | f13 | f14 |
| | 23k (I11) | f7 | f8 | f15 | f16 |

FIG.8C

|  | OUTPUT WAVEGUIDE GROUP | | | |
|---|---|---|---|---|
|  | 27f (J6) | 27g (J7) | 27j (J10) | 27k (J11) |
| INPUT WAVEGUIDE GROUP | 23c (I3) | f1 | f2 | f5 | f6 |
| | 23e (I5) | f3 | f4 | f7 | f8 |
| | 23k (I11) | f9 | f10 | f13 | f14 |
| | 23m (I13) | f11 | f12 | f15 | f16 |

FIG.9

SECOND INPUT / OUTPUT WAVEGUIDE

| | 27a (J1) | 27b (J2) | 27c (J3) | 27d (J4) | 27e (J5) | 27f (J6) | 27g (J7) | 27h (J8) | 27i (J9) | 27j (J10) | 27k (J11) | 27l (J12) | 27m (J13) | 27n (J14) | 27o (J15) | 27p (J16) |
|---|---|---|---|---|---|---|---|---|---|---|---|---|---|---|---|---|
| 23a (I1) | f10 | f11 | f12 | f13 | f14 | f15 | f16 | f1 | f2 | f3 | f4 | f5 | f6 | f7 | f8 | f9 |
| 23b (I2) | f11 | f12 | f13 | f14 | f15 | f16 | f1 | f2 | f3 | f4 | f5 | f6 | f7 | f8 | f9 | f10 |
| 23c (I3) | f12 | f13 | f14 | f15 | f16 | f1 | f2 | f3 | f4 | f5 | f6 | f7 | f8 | f9 | f10 | f11 |
| 23d (I4) | f13 | f14 | f15 | f16 | f1 | f2 | f3 | f4 | f5 | f6 | f7 | f8 | f9 | f10 | f11 | f12 |
| 23e (I5) | f14 | f15 | f16 | f1 | f2 | f3 | f4 | f5 | f6 | f7 | f8 | f9 | f10 | f11 | f12 | f13 |
| 23f (I6) | f15 | f16 | f1 | f2 | f3 | f4 | f5 | f6 | f7 | f8 | f9 | f10 | f11 | f12 | f13 | f14 |
| 23g (I7) | f16 | f1 | f2 | f3 | f4 | f5 | f6 | f7 | f8 | f9 | f10 | f11 | f12 | f13 | f14 | f15 |
| 23h (I8) | f1 | f2 | f3 | f4 | f5 | f6 | f7 | f8 | f9 | f10 | f11 | f12 | f13 | f14 | f15 | f16 |
| 23i (I9) | f2 | f3 | f4 | f5 | f6 | f7 | f8 | f9 | f10 | f11 | f12 | f13 | f14 | f15 | f16 | f1 |
| 23j (I10) | f3 | f4 | f5 | f6 | f7 | f8 | f9 | f10 | f11 | f12 | f13 | f14 | f15 | f16 | f1 | f2 |
| 23k (I11) | f4 | f5 | f6 | f7 | f8 | f9 | f10 | f11 | f12 | f13 | f14 | f15 | f16 | f1 | f2 | f3 |
| 23l (I12) | f5 | f6 | f7 | f8 | f9 | f10 | f11 | f12 | f13 | f14 | f15 | f16 | f1 | f2 | f3 | f4 |
| 23m (I13) | f6 | f7 | f8 | f9 | f10 | f11 | f12 | f13 | f14 | f15 | f16 | f1 | f2 | f3 | f4 | f5 |
| 23n (I14) | f7 | f8 | f9 | f10 | f11 | f12 | f13 | f14 | f15 | f16 | f1 | f2 | f3 | f4 | f5 | f6 |
| 23o (I15) | f8 | f9 | f10 | f11 | f12 | f13 | f14 | f15 | f16 | f1 | f2 | f3 | f4 | f5 | f6 | f7 |
| 23p (I16) | f9 | f10 | f11 | f12 | f13 | f14 | f15 | f16 | f1 | f2 | f3 | f4 | f5 | f6 | f7 | f8 |

FIRST INPUT / OUTPUT WAVEGUIDE

FIG.12

| | | OUTPUT WAVEGUIDE GROUP | | | | | | | |
|---|---|---|---|---|---|---|---|---|---|
| | | 27d (J4) | 27e (J5) | 27f (J6) | 27g (J7) | 27h (J8) | 27i (J9) | 27j (J10) | 27k (J11) |
| INPUT WAVEGUIDE GROUP | 23e (I5) | f1 | f2 | f3 | f4 | f5 | f6 | f7 | f8 |
| | 23m (I13) | f9 | f10 | f11 | f12 | f13 | f14 | f15 | f16 |

FIG.13

| | | OUTPUT WAVEGUIDE GROUP | | | | | | | |
|---|---|---|---|---|---|---|---|---|---|
| | | 27a (J1) | 27c (J3) | 27e (J5) | 27g (J7) | 27i (J9) | 27k (J11) | 27m (J13) | 27o (J15) |
| INPUT WAVEGUIDE GROUP | 23h (I8) | f1 | f3 | f5 | f7 | f9 | f11 | f13 | f15 |
| | 23i (I9) | f2 | f4 | f6 | f8 | f10 | f12 | f14 | f16 |

FIG.19 (PRIOR ART)

| | OUTPUT WAVEGUIDE GROUP | | | | | | | | | | | | | | | |
|---|---|---|---|---|---|---|---|---|---|---|---|---|---|---|---|---|
| | 27a (J1) | 27b (J2) | 27c (J3) | 27d (J4) | 27e (J5) | 27f (J6) | 27g (J7) | 27h (J8) | 27i (J9) | 27j (J10) | 27k (J11) | 27l (J12) | 27m (J13) | 27n (J14) | 27o (J15) | 27p (J16) |
| 23a (I1) | f-6 | f-5 | f-4 | f-3 | f-2 | f-1 | f0 | f1 | f2 | f3 | f4 | f5 | f6 | f7 | f8 | f9 |
| 23b (I2) | f-5 | f-4 | f-3 | f-2 | f-1 | f0 | f1 | f2 | f3 | f4 | f5 | f6 | f7 | f8 | f9 | f10 |
| 23c (I3) | f-4 | f-3 | f-2 | f-1 | f0 | f1 | f2 | f3 | f4 | f5 | f6 | f7 | f8 | f9 | f10 | f11 |
| 23d (I4) | f-3 | f-2 | f-1 | f0 | f1 | f2 | f3 | f4 | f5 | f6 | f7 | f8 | f9 | f10 | f11 | f12 |
| 23e (I5) | f-2 | f-1 | f0 | f1 | f2 | f3 | f4 | f5 | f6 | f7 | f8 | f9 | f10 | f11 | f12 | f13 |
| 23f (I6) | f-1 | f0 | f1 | f2 | f3 | f4 | f5 | f6 | f7 | f8 | f9 | f10 | f11 | f12 | f13 | f14 |
| 23g (I7) | f0 | f1 | f2 | f3 | f4 | f5 | f6 | f7 | f8 | f9 | f10 | f11 | f12 | f13 | f14 | f15 |
| 23h (I8) | f1 | f2 | f3 | f4 | f5 | f6 | f7 | f8 | f9 | f10 | f11 | f12 | f13 | f14 | f15 | f16 |
| 23i (I9) | f2 | f3 | f4 | f5 | f6 | f7 | f8 | f9 | f10 | f11 | f12 | f13 | f14 | f15 | f16 | f17 |
| 23j (I10) | f3 | f4 | f5 | f6 | f7 | f8 | f9 | f10 | f11 | f12 | f13 | f14 | f15 | f16 | f17 | f18 |
| 23k (I11) | f4 | f5 | f6 | f7 | f8 | f9 | f10 | f11 | f12 | f13 | f14 | f15 | f16 | f17 | f18 | f19 |
| 23l (I12) | f5 | f6 | f7 | f8 | f9 | f10 | f11 | f12 | f13 | f14 | f15 | f16 | f17 | f18 | f19 | f20 |
| 23m (I13) | f6 | f7 | f8 | f9 | f10 | f11 | f12 | f13 | f14 | f15 | f16 | f17 | f18 | f19 | f20 | f21 |
| 23n (I14) | f7 | f8 | f9 | f10 | f11 | f12 | f13 | f14 | f15 | f16 | f17 | f18 | f19 | f20 | f21 | f22 |
| 23o (I15) | f8 | f9 | f10 | f11 | f12 | f13 | f14 | f15 | f16 | f17 | f18 | f19 | f20 | f21 | f22 | f23 |
| 23p (I16) | f9 | f10 | f11 | f12 | f13 | f14 | f15 | f16 | f17 | f18 | f19 | f20 | f21 | f22 | f23 | f24 |
| INPUT WAVEGUIDE GROUP | | | | | | | | | | | | | | | | |

TUNABLE OPTICAL FILTER

BACKGROUND OF THE INVENTION

1. Field of the Invention

The present invention relates to tunable optical filters which are able to extract optical signals of desired frequencies from a plurality of optical signals which have been frequency-division-multiplexed (or wavelength-division-multiplexed) and propagate on the same optical path.

2. Related Art

Tunable optical filters will be key components in future optical frequency-division-multiplexed networks, which are expected to have high capacity and increased flexibility. Conventionally, optical filters which apply the principles of Fabry-Perot interferometers are known.

For example, if the end surfaces of cut optical fibers are polished and positioned opposite each other, light will be multiply reflected at both end surfaces. At certain frequencies, the multiply reflected light will be in phase and constructively interfere, thereby passing through. In this case, the values of the frequencies which are passed will continuously vary depending on the distance between the end surfaces. Therefore, by varying this distance, it is possible to select optical signals of only desired frequencies.

However, since the passed frequency values are only able to be controlled continuously (analog control) with this type of optical filter, there is the disadvantage that the analog control must be highly precise when there is a large number of frequency-division-multiplexed channels. Additionally, there is the problem that it is difficult to increase the tuning speed of the optical filters because the control circuits become too complicated.

In order to solve the above-mentioned problems, some conventional tunable optical filters have been made with a plurality of optical ON/OFF switches and an arrayed-waveguide grating router. This conventional example will be explained with reference to FIGS. 17–19. For details on this conventional example, refer to pages 617 and 618 of the Lecture Thesis Collection of the Electronic Data Communications Society Autumn 1994 Convention (Communication 2) (Lecture No. SB-8-8, "Arrayed-waveguide Grating Router with Optical Return Path", Ishida, Takahashi, Inoue and Suzuki).

The operating principles of a conventional tunable optical filter will be explained with reference to FIG. 17. In the drawing, reference numerals 1 and 2 indicate optical fibers. Optical signals of n different frequencies $f_1, f_2, \ldots, f_n$ are frequency-division-multiplexed and propagate through the optical fiber 1.

In a conventional tunable optical filter 3, the incident multiplexed optical signal is first separated into n optical signals of different frequencies $f_1, f_2, \ldots, f_n$ by means of a demultiplexer 4, which propagate through corresponding optical fibers $8_1, 8_2, \ldots, 8_n$. Optical switches $9_1, 9_2, \ldots, 9_n$ are provided on each optical fiber $8_1$–$8_n$, and only the optical switch $9_i$ corresponding to a selected frequency $f_i$ is turned ON. The optical signal of frequency $f_i$ selected in this way is output to an optical fiber 2 via a multiplexer 5.

A conventional tunable optical filter working on the operating principles demonstrated in FIG. 17 is illustrated in FIG. 18. In FIG. 18, an arrayed-waveguide grating router 21 comprises an input waveguide group 23 composed of a plurality of input waveguides 23a~23p, a slab waveguide 24, an arrayed-waveguide grating 26, a slab waveguide 25 and an output waveguide group 27 composed of a plurality of output waveguides 27a~27p, each element of which is formed on the same substrate. An optical fiber group 18 comprises optical fibers 18a~18p, and an optical switch group 9 comprises optical switches 9a~9p.

In the following explanation, an index I1~I16 will be applied to each waveguide 23a~23p of the input waveguide group 23 to identify the waveguide to which is being referred. For example, when specifying the seventh waveguide 23g, the following index will be used: waveguide 23g (I7) or 23 (I7). In the same manner, indices J1~J16, K1~K16, and S1~S16 will be used to indicate the waveguides 27a~27p, optical fibers 18a~18p and optical switches 9a~9p respectively.

Explaining with this identification system, each optical fiber 18 (Kj) (wherein j=1, 2, 3, . . . , 16) connects each waveguide 27 (Jj) of the output waveguide group 27 with each waveguide 23 (Ij) of the input waveguide group 23, acting as a loop-back optical path which returns the optical signal outputted from each waveguide 27 (Jj) back to the corresponding waveguide 23 (Ij). Additionally, an optical switch 9 (Sj) is provided on each optical fiber 18 (Kj). The optical fibers 1, 2 respectively act as an input path and an output path.

Generally, the number of waveguides X, Y of the input waveguide group 23 and the output waveguide group 27 of an arrayed-waveguide grating router 21 is arbitrary, but for the sake of simplification, it will be assumed that X=Y=16, optical fiber 1 is connected to waveguide 23h (I8) and optical fiber 2 is connected to waveguide 27h (J8).

In the conventional example shown in FIG. 18, a frequency-division-multiplexed optical signal having sixteen wavelengths $f_1, f_2, \ldots, f_{16}$ is transmitted through optical fiber 1 and then inputted to waveguide 23h (I8) of the arrayed-waveguide grating router 21. At the slab waveguide 24, the frequency-division-multiplexed optical signal is spread so as to be inputted to the plurality of waveguides forming the arrayed-waveguide grating 26. After the frequency-division-multiplexed optical signal propagates through the arrayed-waveguide grating 26, it is diffracted at the slab waveguide 25. At this time, the convergence position at which the optical signal converges differs depending on the optical frequency due to a phase difference generated during propagation through the arrayed-waveguide grating 26.

The arrayed-waveguide grating router 21 shown in FIG. 18 applies these operating principles, and is designed to have the router connectivities shown in FIG. 19. For example, when a frequency-division-multiplexed optical signal formed from optical signals of frequencies $f_1, f_2, \ldots, f_{16}$ is inputted to waveguide 23h (I8), an optical signal of frequency $f_1$ is extracted from waveguide 27a J1), an optical signal of frequency $f_2$ is extracted from waveguide 27b (J2), . . . , and an optical signal of frequency $f_{16}$ is extracted from waveguide 27p (J16), such that each frequency $f_j$ (wherein j=1, 2, . . . , 16) is extracted from a waveguide 27 (Jj) having the same index. Additionally, when the frequency-division-multiplexed optical signal is inputted to waveguide 23i (I9) which has an index one larger than waveguide 23h (I8), the relationship between each frequency optical signal ($f_1$ –$f_{16}$) and the output waveguide 27 (Jj) from which it is output shifts by one waveguide as shown in FIG. 19. Therefore, if a frequency-division-multiplexed optical signal is inputted to waveguide 23i (I9) having an index which is one larger than the waveguide 23h (I8), then an optical signal of frequency $f_2$ is extracted from waveguide 27a (J1), . . . , and an optical signal of frequency $f_{16}$ is extracted from waveguide 27o (J15).

In the conventional example shown in FIG. 18, the optical signals of frequency $f_j$ extracted from the waveguides 27 (Jj) respectively propagate through the optical fibers (loop-back optical path) 18 (Kj). Each of the optical switches 9 (Sj) provided on the optical fibers 18 (Kj) is put into either an ON state which passes light or an OFF state which blocks light.

An optical signal propagating through a loop-back optical path with an optical switch in the ON state is re-introduced from the input waveguide group 23 into the arrayed-waveguide grating router 21. An important point in this case is that the j-th optical fiber 18 (Kj) should be connected to the waveguide 23 (Ij) in the input waveguide group 23 having the same index. In this case, the arrayed-waveguide grating router 21 is designed to have the router connectivities shown in FIG. 19, so the optical signals of frequency $f_j$ which are re-introduced into the waveguides 23 (Ij) via the switches 9 (Sj) are outputted from the waveguides 27 (J8) to optical fiber 2 without regard to the values of the indices j.

On the other hand, the optical signals propagating through the optical fibers 18 (Kj) wherein the optical switches 9 (Sj) are in an OFF state are not re-introduced into the arrayed-waveguide grating router 21 and are therefore not outputted to optical fiber 2. Consequently, if the optical switch 9 (Sj) of only the optical fiber 18 (Kj) through which a desired frequency of light is propagating is put into an ON state and the other optical switches 9 are turned OFF, then only an optical signal of frequency $f_j$ corresponding to the optical switch 9 (Sj) which is ON and an optical signal of frequency $f_g$ are outputted from the optical fiber 2. By making the signal inputted into the arrayed-waveguide grating router 21 such as not to contain an optical signal of frequency $f_g$, it is possible to obtain an optical signal of the desired frequency from the optical fiber 2.

Thus, a conventional tunable optical filter as shown in FIG. 18 is able to select optical signals of desired frequencies by digital control, and does not require high-precision analog control even if the number of frequency-division-multiplexed channels increases.

However, the conventional tunable optical filter explained by FIG. 18 has the disadvantages of high loss and the need for a large number of optical switches.

The total loss for the optical signal which is selected and outputted to optical fiber 2 would be $2\alpha$ (dB) where $\alpha$ denotes the loss in the arrayed-wavelength grating router 21. This is because the optical signal passes through the router twice. The arrayed-waveguide grating routers which are currently known have losses $\alpha \geq 5$ (dB) depending on the optical frequency, and upon passing twice therethrough, the optical intensity would decrease to less than 0.1 times (−10 dB).

Additionally, as was explained with reference to FIG. 18, in order to extract an arbitrary optical signal from frequency-division-multiplexed signal having Z (wherein Z is a natural number) frequency channels, Z optical switches are required. Consequently, it is necessary to have many optical switches if the number of frequency-division-multiplexed channels Z increases, resulting in increased costs and electrical expenditures, as well as reduced reliability.

Another conventional tunable optical filter relating to the present invention is disclosed in U.S. Pat. Ser. No. 5,233,453 entitled "Tunable Optical Filter". This tunable optical filter comprises a fixed tuned filter array and optical switches. With this tunable optical filter, the input light is led to one of the fixed tuned filters by means of a first optical switch, and its output is led to an output optical path by means of a second optical switch. Each optical switch comprises 1×2 optical switches arranged in a tree-structure. However, this filter requires a large number of fixed tuned filters and a large number of 1×2 optical switches. For example, in order to extract a single arbitrary channel from among Z channels, Z fixed tuned filters and approximately 2Z 1×2 optical switches are required.

Additional related art is described in the following publications:

(1) B. Glance et al., IEEE Journal of Lightwave Technology, vol. 12, No. 6, pp. 957–962, 1994. "Applications of the Integrated Waveguide Grating Router"

(2) U.S. Pat. Ser. No. 5,373,517 entitled "Tunable Laser Apparatus"

SUMMARY OF THE INVENTION

The present invention resulted upon consideration of the above-mentioned situation, and its object is to offer a digitally tunable optical filter which has low loss and requires only a small number of optical switches.

The tunable optical filter using an arrayed-waveguide grating router according to the present invention has as its most important features an optical path connection means which connects one of M (wherein M is an integer greater than or equal to 2) waveguides in an input waveguide group of the arrayed-waveguide grating router with an input optical path, and an optical path selection means which selects one of N (wherein N is an integer greater than or equal to 2) waveguides in an output waveguide group of the arrayed-waveguide grating router.

The optical path connection means selects one of M waveguides in the input waveguide group of the arrayed-waveguide grating router and connects it to the input optical path. By switching the input waveguide which is connected by the optical path connection means, the arrayed-waveguide grating router offers M different router connectivities with respect to the frequency-division-multiplexed signal which enters from the input optical path. On the other hand, the optical path selection means selects one of N waveguides in the output waveguide group of the arrayed-waveguide grating router. By switching the output waveguide connected by the optical path selection means, it is possible to select N different frequencies for the optical signal. The optical path connection means and the optical path selection means are able to be composed of optical switches, electrical switches or the like; for example, if both are composed of optical switches, then it is possible to obtain a maximum of M·N different frequency selection characteristics due to the combination of the two optical switches. The selected optical signal only passes through the arrayed-waveguide grating router once. In this way, a digitally tunable optical filter having minimal losses and requiring only a small number of optical switches, which is the object of the present invention, is offered.

BRIEF DESCRIPTION OF THE DRAWINGS

FIG. 2 is a diagram explaining a construction method of a 1×4 optical switch according to a first embodiment of the present invention.

FIG. 3 is a diagram showing the router connectivities of the arrayed-waveguide grating router having sixteen input and output waveguides.

FIG. 4 is a diagram explaining the frequency selection operation according to a first embodiment of the present invention.

FIG. 5 is a diagram explaining the effect of reducing the number of optical switches in the present invention.

FIG. 8A is a diagram explaining another frequency selection operation according to a first embodiment of the present invention.

FIG. 8B is a diagram explaining yet another frequency selection operation according to a first embodiment of the present invention.

FIG. 8C is a diagram explaining yet another frequency selection operation according to a first embodiment of the present invention.

FIG. 9 is a diagram showing the frequency connectivities of an arrayed-waveguide grating router having periodicity with sixteen frequency-division-multiplexed channels.

FIG. 12 is a diagram explaining the frequency selection operation of a third embodiment of the present invention.

FIG. 13 is a diagram explaining a different frequency selection operation of a third embodiment of the present invention.

FIG. 19 is a diagram showing the frequency connectivities of an arrayed-waveguide grating router with sixteen input and output waveguides.

DETAILED DESCRIPTION OF THE PREFERRED EMBODIMENTS

The preferred embodiments of the tunable optical filter of the present invention will be explained in detail hereinbelow with reference to the drawings. In the following embodiments, the input/output waveguides which the arrayed-waveguide grating router does not use may be removed. However, when identifying the waveguides by number, the removed waveguides should be included in the count.

[First Embodiment]

Figure 1:
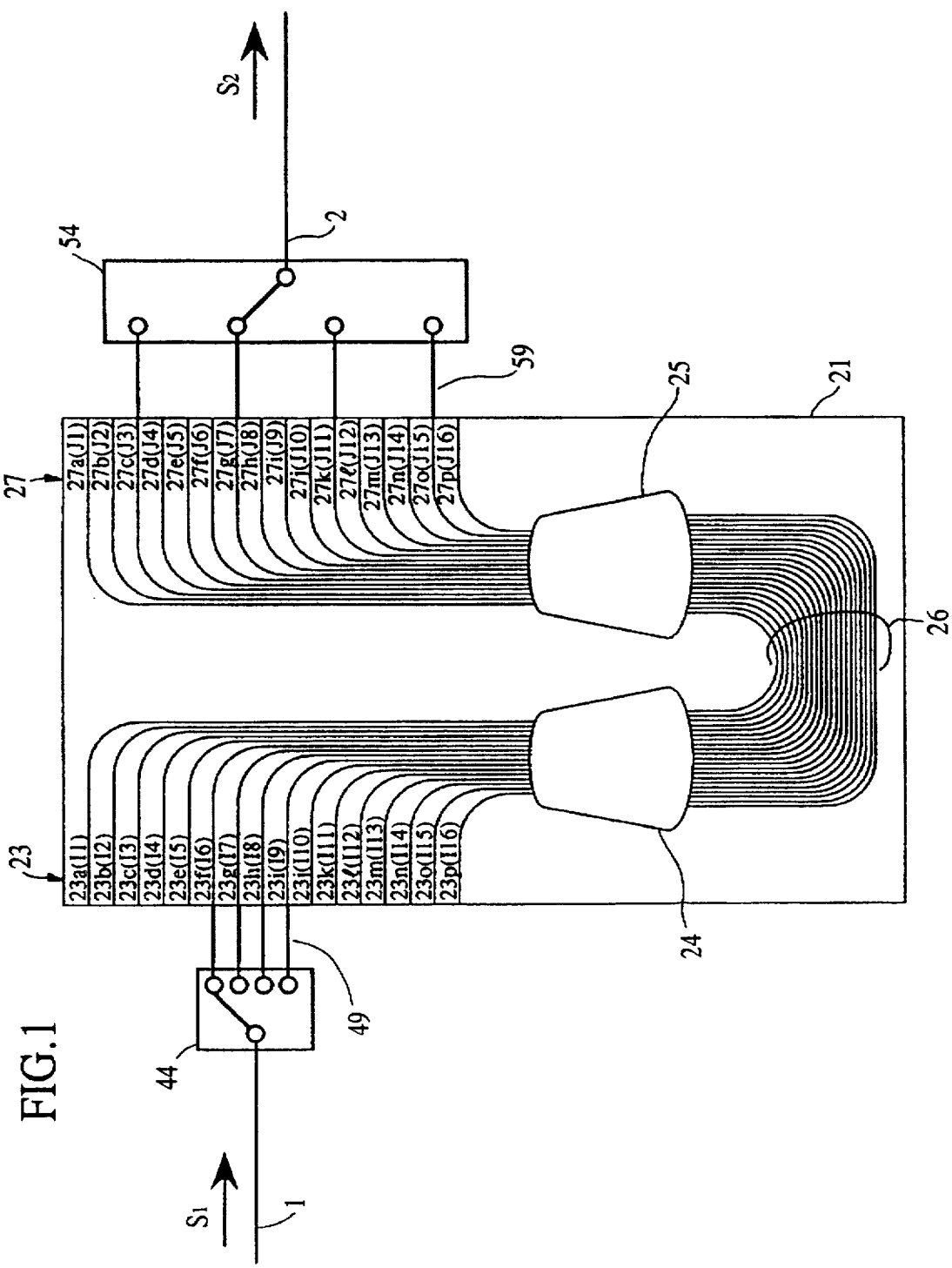
FIG. 1 is a structural diagram showing a tunable optical filter according to a first embodiment of the present invention.

FIG. 1 is a structural diagram showing a first embodiment of the tunable optical filter of the present invention.

Figure 18:
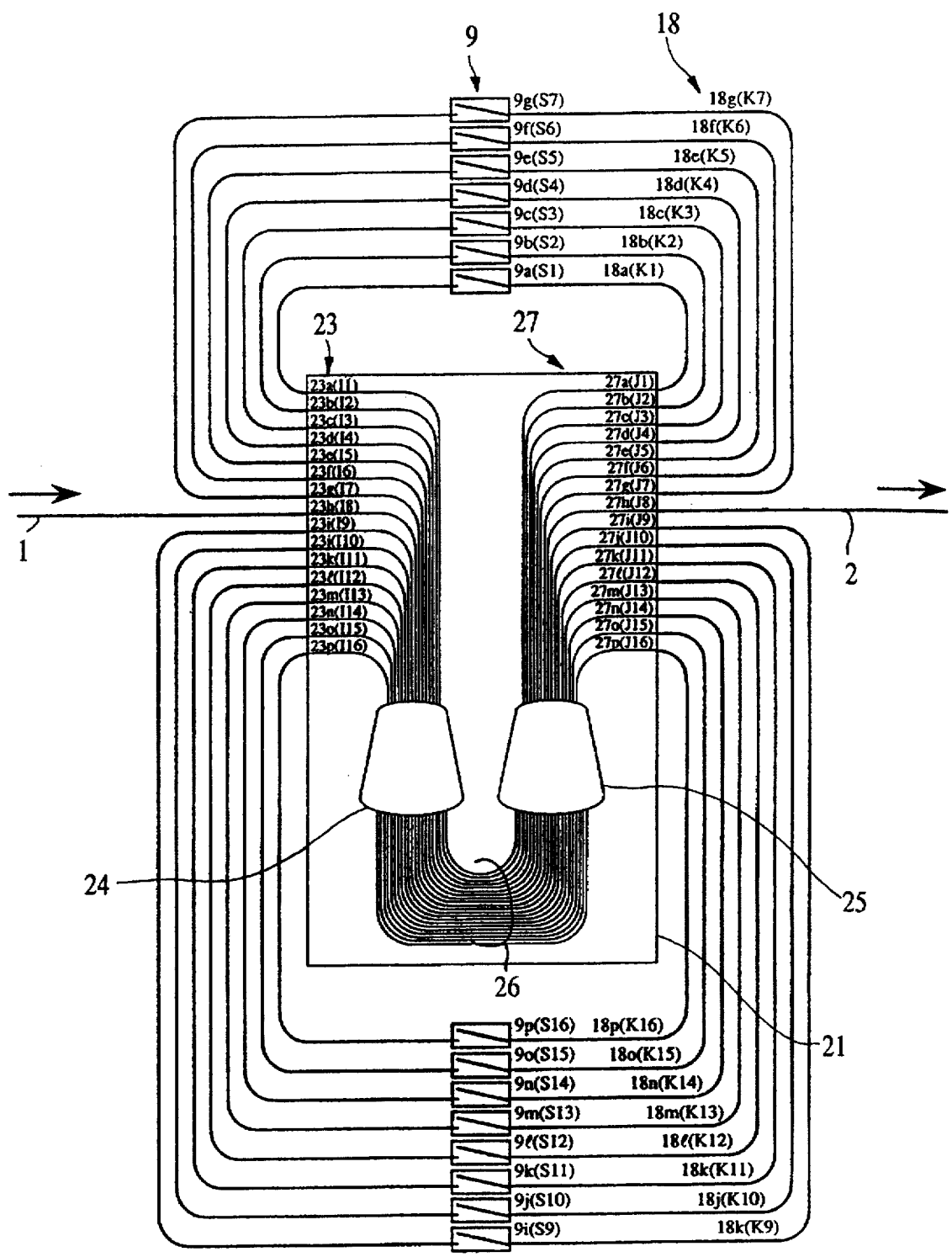
FIG. 18 is a structural diagram showing a conventional tunable optical filter.

Similar to the conventional example explained with reference to FIG. 18, this tunable optical filter uses an arrayed-waveguide grating router 21 wherein the input waveguide group 23 and the output waveguide group 27 are each formed from sixteen waveguides. This arrayed-waveguide grating router 21 has slab waveguide 24, 25 and an arrayed-waveguide grating 26. Additionally, the arrayed-waveguide grating router 21 is designed to have the router connectivities shown in FIG. 19, as with the conventional example. Since the arrayed-waveguide grating router 21 has the ability to multiplex or demultiplex sixteen channels of frequency-division-multiplexed signal, it will henceforth be referred to as a sixteen-channel arrayed-waveguide grating router (Z=16).

In FIG. 1, a first 1×4 optical switch 44 and a second 1×4 optical switch 54 are respectively connected to four waveguides in the input waveguide group 23 and four waveguides in the output waveguide group 27 of the arrayed-waveguide grating router 21 by means of optical fiber groups 49, 59. In this case, the four output ports of the first optical switch 44 are respectively connected to waveguides 23f (I6), 23g (I7), 23h (I8) and 23i (I9), while the four input ports of the second optical switch 54 are respectively connected to waveguides 27c (J3), 27g (J7), 27k (J11) and 27o (J15). Additionally, the optical fibers 1, 2 correspond respectively to an input optical path and an output optical path, which are connected to the optical switches 44, 54. Note that optical fiber 2 is not necessarily restricted to optical output means using optical fibers, and can be replaced by other elements such as optical connectors or spatial light output.

The 1×4 optical switches 44, 54 can, as an example, be composed of three 1×2 optical switches 521–523 connected in a tree-structure as shown in FIG. 2. As 1×2 optical switches, it is possible to use many different types, such as mechanical switches which mechanically move fiber ferrules or prisms, liquid-crystal switches which change the refractive index of liquid crystal by applying voltage thereto, or thermo-optic switches which change the refractive index of a portion of a waveguide in a waveguide-type interferometer formed on a silica substrate by applying heat thereto.

Next, the operation of the tunable optical filter according to the first embodiment shown in FIG. 1 will be explained with reference to FIGS. 3 and 4.

After propagating through optical fiber 1, the frequency-division-multiplexed optical signal $S_1$ containing sixteen channels of optical frequency $f_1, f_2, \ldots, f_{16}$ is inputted to the first optical switch 44. The first optical switch 44 outputs this frequency-division-multiplexed optical signal $S_1$ to one of the four output ports. The frequency-division-multiplexed optical signal outputted from one of the ports of the first optical switch 44 is inputted to one of the waveguides in the input waveguide group 23 of the arrayed-waveguide grating router 21 via a corresponding optical fiber in the optical fiber group 49. That is, one of the four waveguides 23f (I6), 23g (I7), 23h (I8) or 23i (I9) is selected for inputting the frequency-division-multiplexed optical signal $S_1$ by means of the first optical switch 44.

The arrayed-waveguide grating router 21 has the router connectivities shown in FIG. 3 (same as FIG. 19). Thus, if the frequency-division-multiplexed optical signal $S_1$ is inputted to waveguide 23f (I6), an optical signal of frequency $f_1$ is outputted to waveguide 27c (J3) and inputted to the first input port (the uppermost port in the drawing) of the second optical switch 54 via the corresponding optical fiber in the optical fiber group 59. Similarly, in accordance with FIG. 3, optical signals of frequency $f_5$, $f_9$ and $f_{13}$ respectively pass through waveguides 27g (J7), 27k (J11) and 27o (J15) and their corresponding optical fibers in the optical fiber group 59, and are respectively inputted to the second, third and fourth input ports of the second optical switch 54.

On the other hand, if the frequency-division-multiplexed optical signal $S_1$ is inputted to three other waveguides 23g (I7), 23h (I8) or 23i (I9) by means of the first optical switch 44, then optical signals of frequency $f_2$, $f_3$ or $f_4$ will be inputted to the first input port of the second optical switch 54 via waveguide 27c (J3). Again in the same manner, optical signals of frequency $f_6$, $f_7$ or $f_8$, frequency $f_{10}$, $f_{11}$ or $f_{12}$ and frequency $f_{14}$, $f_{15}$ or $f_{16}$ will be inputted to the second, third and fourth input ports of the second optical switch 54.

FIG. 4 shows the relationship between the four waveguides in the input waveguide group 23 to which the frequency-division-multiplexed optical signal $S_1$ is inputted and the frequency of the optical signals outputted from four of the waveguides in the output waveguide group 27. For example, if the first optical switch 44 selects waveguide 23g (I7) and the second optical switch 54 selects waveguide 27k (J11), an optical signal of frequency $f_{10}$ is outputted to optical fiber 2 as the selected optical signal $S_2$. In this way, by means of the four possible selections of the first optical switch 44 and the four possible selections of the second optical switch 54, one of the sixteen channels of the frequency-division-multiplexed optical signal $S_1$ can be obtained as the selected optical signal $S_2$.

In the first embodiment shown in FIG. 1, the selected optical signal $S_2$ only passes through the arrayed-waveguide grating router 21 once. Therefore, the loss for the optical signal $S_2$ can be held to half that of the conventional example (FIG. 18) wherein two passages are required.

Furthermore, the first embodiment shown in FIG. 1 requires only six optical switches since the optical switches 44, 54 are each composed of three 1×2 optical switches as explained in FIG. 2. In contrast, the conventional example explained with reference to FIG. 18 requires sixteen optical switches to select an optical signal of one desired frequency from an optical signal containing sixteen multiplexed frequencies.

While the present first embodiment and the embodiments to follow use a sixteen-channel arrayed-waveguide grating router 21 wherein Z=16, it is also possible to use arrayed-waveguide grating routers with a different number of frequency-division-multiplexed channels. For example, a similar tunable optical filter can be constructed with an arrayed-waveguide grating router wherein the number of frequency-division-multiplexed channels $Z=4^n$ (wherein n is a natural number) and two $1 \times 2^n$ optical switches, which can select a single arbitrary channel out of a frequency-multiplexed signal having a maximum of $4^n$ channels. In this case, the required number of 1×2 optical switches is $(2^n-1) \cdot 2$. In contrast, the conventional example shown in FIG. 18 requires $4^n$ optical switches. FIG. 5 shows the number of switches required for various values of n (values of Z). The exceptional effects of the present invention are readily apparent in the markedly reduced number of necessary switches.

Figures 6, 7A, 7B:
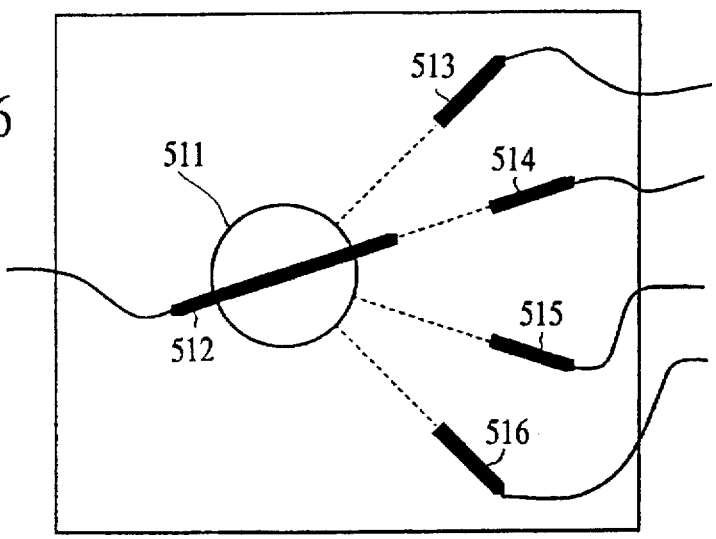
FIG. 6 is a diagram explaining a construction method of a 1×4 optical switch according to a first embodiment of the present invention.
FIG. 7A is a diagram explaining a frequency selection operation different from that of FIG. 4 according to a first embodiment of the present invention.
FIG. 7B is a diagram explaining a frequency selection operation different from that of FIG. 4 according to a first embodiment of the present invention.

As 1×4 optical switches 44, 54, it is also possible to use rotary-type mechanical switches as shown in FIG. 6. In FIG. 6, the rotary-type mechanical optical switch comprises a rotary step motor 511 and collimator-installed fiber ferrules 512–516. An optical fiber is connected to each of the ferrules 512–516. The switch is turned over by rotating the ferrule 512 by means of the rotary step motor 511. A 1×4 optical switch is completed by making the rotation stop at a position wherein the light released from the ferrule 512 is incident on one of the ferrules 513–516. Alternatively, each of the 1×4 optical switches 44, 54 can be formed from a 1×4 tree coupler and four optical intensity modulators or semiconductor optical amplifiers. That is, the incident light can be separated into four parts by means of the 1×4 tree coupler and each of the four separated outputs can be turned ON/OFF by the optical intensity modulator or semiconductor optical amplifiers.

In the first embodiment explained with reference to FIG. 1, the four outputs of the first optical switch 44 are respectively connected to the input waveguides 23f (I6), 23g (I7), 23h (I8) and 23i (I9) of the arrayed-waveguide grating router 21, and the four inputs of the second optical switch 54 are respectively connected to the output waveguides 27c (J3), 27g (J7), 27k (J11) and 27o (J15), but the method of connection is not restricted thereto. As an example, another connection method is shown in FIGS. 7A and 7B using the same type of table as in FIG. 4.

Furthermore, it is possible to construct a tunable optical filter having an identical function even if the above-explained indices I and J are interchanged, because the router connectivities of the arrayed-waveguide grating router 21 are symmetrical with respect to the input/output waveguide groups 23, 27. That is, tunable optical filters with identical functions are able to be constructed according to any of the connections shown in FIGS. 8A, 8B or 8C.

Furthermore, in the first embodiment, it is possible to shift the input and output waveguides connected with the optical switches. For example, a tunable optical filter similar to that explained with reference to FIG. 4 can be obtained by connecting the four output ports of the first optical switch 44 to the input waveguides $I_i$, $I_{i+1}$, $I_{i+2}$ and $I_{i+3}$ (wherein i is a natural number and $1 \leq i \leq 13$) which are represented in a generalized format. Similarly, the four input ports of the optical switch 54 may be connected to other output waveguides indicated by $J_j$, $J_{j+4}$, $J_{j+8}$ and $J_{j+12}$ (wherein j is a natural number and $1 \leq j \leq 4$).

Furthermore, by designing the arrayed-waveguide grating router 21 so that the router connectivities exhibit periodicity, it is possible to enlarge the possible ranges of the natural numbers i and j so that $1 \leq i$, $j \leq 16$. Here, periodicity refers to the situation wherein, assuming the number of frequency-division-multiplexed channels in the arrayed-waveguide grating router 21 to be Z, optical signals of frequency $f_j$ and optical signals of frequency $f_{j+z}$ have the same router connectivities. FIG. 9 shows an example of the router connectivities of a sixteen-channel (Z=16) arrayed-waveguide grating router having periodic properties. In this case, when the natural number i becomes greater than 16, the index $I_i$ may be replaced by an index $I_i'$ such that:

$i'=1+\text{Mod}\,[i-1, 16]$ (wherein Mod [A, B] represents the remainder when A is divided by B).

For example, index I17 would be replaced by index I1 and index I18 would be replaced by index I2. The same applies to the indices $J_j$ as well.

If the arrayed-waveguide router 21 has a route connectivity with a periodicity of M·N, the optical path connector 44 will connect an input optical path with one of M waveguides labeled $x'_j$ where j=1, 2, . . . , M, and $x'_j=1+\text{Mod}(x_j-1, M\cdot N)$. The optical path selector 59 selects one of N waveguides labeled $y'_j$ where j=1,2, . . . , N, and $y'_j=1+\text{Mod}(y_j-1, M\cdot N)$.

Additionally, in the first embodiment explained with reference to FIG. 1 and the embodiments to follow, the waveguides in the input and output waveguide groups connected to the first and second optical switches may be changed with regard to one or more ports of the optical switches. That is, it is possible, for example in the first embodiment, to connect the fourth inlet port of the second optical switch 54 to waveguide 27n (J14) instead of waveguide 27o (J15). In this case, it becomes impossible to select a signal of frequency $f_{16}$, but it is still possible to select one channel out of the remaining fifteen channels.

[Second Embodiment]

Figure 10:
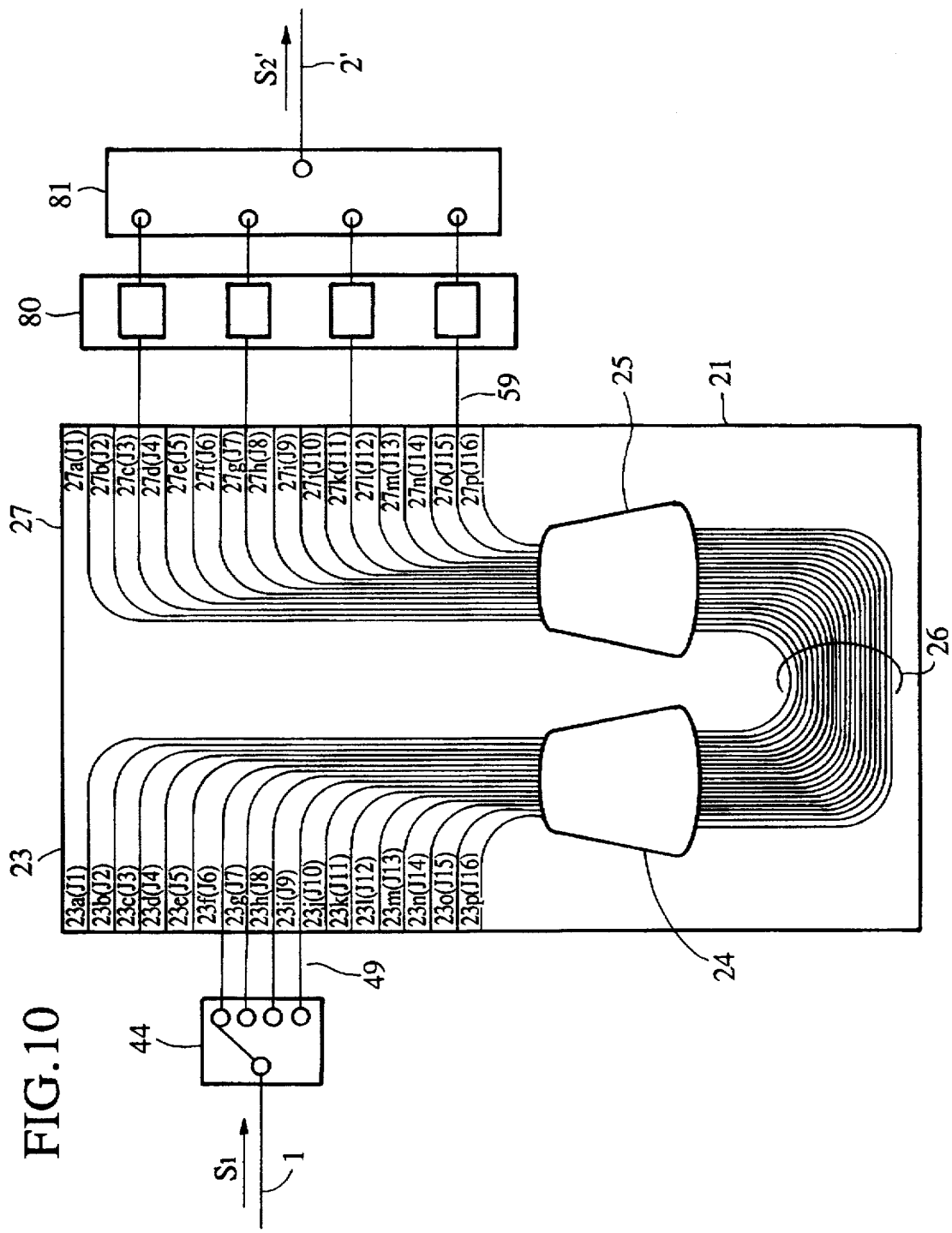
FIG. 10 is a structural diagram showing a tunable optical filter according to a second embodiment of the present invention.

FIG. 10 is a structural diagram showing a second embodiment of the tunable optical filter according to the present invention. The present second embodiment differs from the first embodiment explained with reference to FIG. 1 in that a photo-diode array 80 and an electrical selector 81 are used as optical path selection means instead of a second optical switch 54. Additionally, an electrical output 2' is connected to the output of the electrical selector 81 instead of an optical fiber 2. Coaxial cable, connectors, conductive lines or the like may be used for the electrical output 2'.

Next, the operations of the present embodiment will be explained while focusing on the parts which differ from the above-mentioned first embodiment.

The photo-diode array 80 has four photo-diodes, which respectively convert the optical signals from the waveguides 27c (J3), 27g (J7), 27k (J11) and 27o (J15) into electrical signals. The electrical selector 81 selects and outputs one of the four electrical signals outputted from the photo-diode array 80.

For example, if the frequency-division-multiplexed signal $S_1$ is inputted to waveguide 23f (I6) by means of the first optical switch 44, then optical signals of frequency $f_1, f_5, f_9$ and $f_{13}$ will be converted into electrical signals by the four photo-diodes of the photo-diode array 80, and one of them is selected and outputted by the electrical selector 81. In this case, the frequencies of the four optical signals incident on the photo-diode array 80 can vary in four possible ways depending upon the selection of the first optical switch 44. In this way, by means of the four possible selections of the first optical switch 44 and the four possible selections of the electrical selector 81, one of the sixteen channels of the frequency-division-multiplexed optical signal $S_1$ is converted into an electrical signal $S_2'$ and outputted.

In the second embodiment shown in FIG. 10, the number of required optical switches is further reduced from the first embodiment explained with reference to FIG. 1. Additionally, the number of photo-diodes needed as replacements is only four for sixteen frequency-division-multiplexed channels. Additionally, in comparison to the first embodiment explained with reference to FIG. 1 in which the optical signal may be converted to an electrical signal by connecting a photo-diode to the end of optical fiber 2, the signal-to-noise ratio (S/N) for conversion to an electrical signal is improved because the light incident on the photo-diode array is more intense due to the lack of a second optical switch 54. The afore-mentioned U.S. Pat. No. 5,233,453, the disclosure of which is incorporated herein by reference, describes a structure wherein a second optical switch is replaced by a photo-diode array and an electrical selector. The invention described in U.S. Pat. No. 5,233,453 is different from the present invention in that the frequencies of the optical signals incident on each of the photo-diodes is always held fixed. Consequently, the tunable filter of U.S. Pat. No. 5,233,453 requires the number of photo-diodes to be equal to the number of frequency-division-multiplexed channels, so that the number of photo-diodes needed is quite large in comparison to the present invention.

[Third Embodiment]

Figure 11:
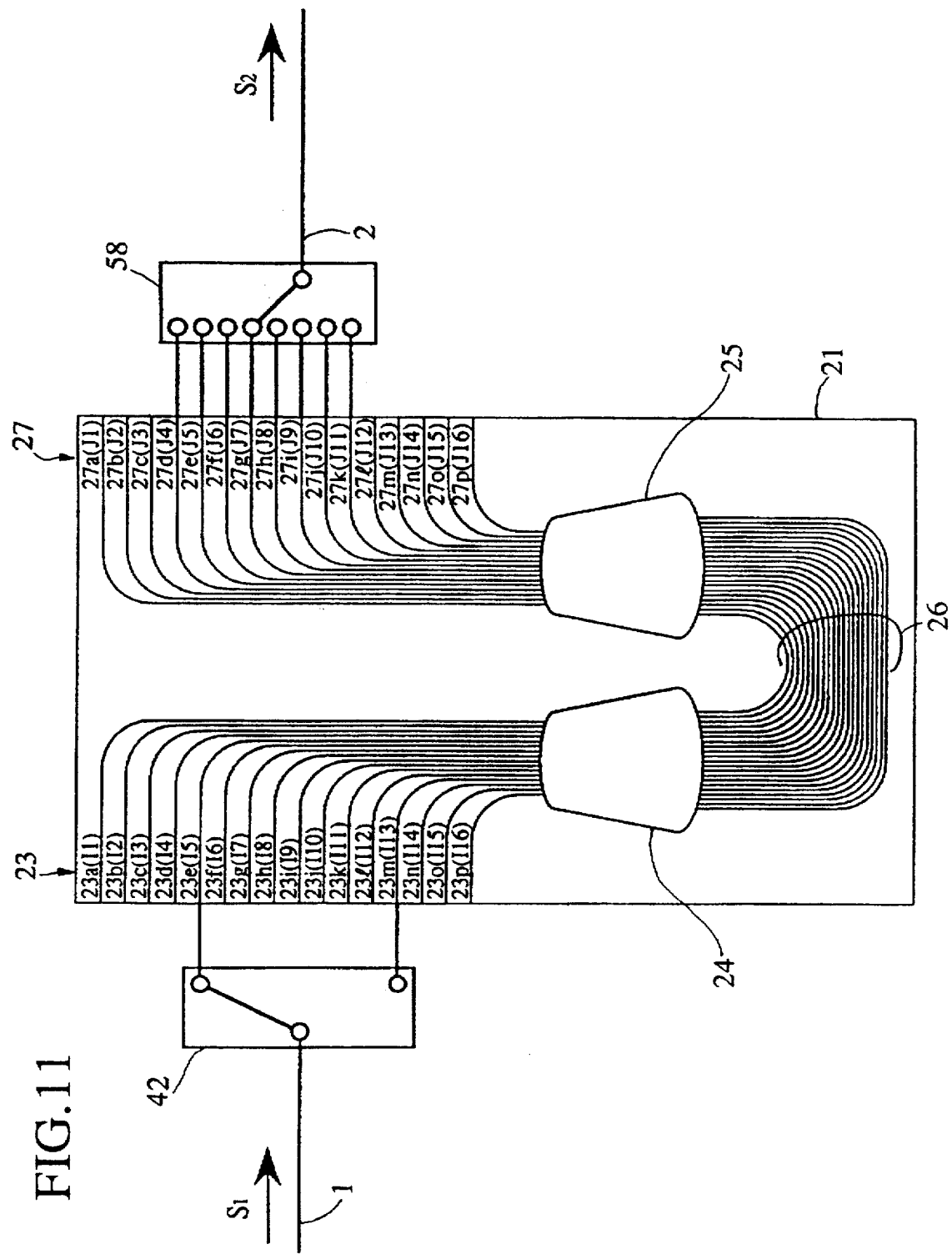
FIG. 11 is a structural diagram showing a tunable optical filter according to a third embodiment of the present invention.

FIG. 11 is a structural diagram showing a third embodiment of the tunable optical filter according to the present invention. The present third embodiment differs from the first embodiment explained with reference to FIG. 1 in that a 1×2 optical switch 42 is provided in place of the 1×4 switch as the first optical switch, its two output ports being connected to waveguides 23e (I5) and 23m (I13) in the input waveguide group 23 of the arrayed-waveguide grating router 21, and a 1×8 switch 58 is provided in place of the 1×4 switch as the second optical switch, its eight input ports being connected to waveguides 27d (J4), 27e (J5), 27f (J6), 27g (J7), 27h (J8), 27i (J9), 27j (J10) and 27k (J11) in the output waveguide group 27 of the arrayed-waveguide grating router 21.

Next, the operations of the third embodiment will be explained while focusing on the parts which differ from the above-mentioned first embodiment.

A frequency-division-multiplexed optical signal $S_1$ containing channels of frequency $f_1, f_2, \ldots, f_{16}$ is inputted to the first optical switch 42 after traveling through optical fiber 1. Depending upon the selection thereby, the frequency-division-multiplexed optical signal $S_1$ is inputted to either one of the two waveguides 23e (I5) and 23m (I13). Since the arrayed-waveguide grating router 21 exhibits the router connectivities shown in FIG. 3, if the frequency-division-multiplexed signal is inputted to waveguide 23e (I5) for example, then an optical signal of frequency $f_1$ is outputted to waveguide 27d (J4) and inputted to the first input port of the second optical switch 58. Similarly, in accordance with FIG. 3, the optical signals of frequency $f_2, f_3, f_4, f_5, f_6, f_7$ and $f_8$ are respectively outputted to waveguides 27e (J5), 27f (J6), 27g (J7), 27h (J8), 27i (J9), 27j (J10) and 27k (J11), and are respectively inputted to the second, third, . . . , eighth input ports of the second optical switch 58. Consequently, if for example the second optical switch 58 connects the first input port and optical fiber 2, then only an optical signal of frequency $f_1$ is outputted to optical fiber 2.

On the other hand, if the frequency-division-multiplexed signal $S_1$ is inputted to the other waveguide 23m (I13) by the first optical switch 42, then optical signals of frequency $f_9, f_{10}, \ldots, f_{16}$ will be respectively inputted to the first through eighth input ports of the second optical switch 58 via waveguides J4, J5, . . . , J11 in the output waveguide group 27.

FIG. 12 collectively shows the relationship between the two waveguides in the input waveguide group 23 to which the frequency-division-multiplexed optical signal $S_1$ is inputted and the frequencies of the optical signals outputted from eight of the waveguides in the output waveguide group 27. As shown in FIG. 12, if for example the first optical switch 42 selects waveguide 23m (I13), then by selecting waveguide 27k (J11) at the second optical switch 58, an optical signal $S_2$ of frequency $f_{16}$ is outputted to optical fiber 2. In this way, by selecting one of the two waveguides to connect with the input optical fiber 1 by means of the first optical switch 42 and selecting one of the eight waveguides to connect with the output optical fiber 2 by means of the second optical switch 58, it is possible to output one channel from the sixteen channels of the frequency-division-multiplexed optical signal.

In the third embodiment shown in FIG. 11, the selected optical signal only passes through the arrayed-waveguide grating router 21 once, and the loss of the optical signal can be held low.

Additionally, in the third embodiment shown in FIG. 11, the 1×8 optical switch 58 can be composed of seven 1×2 switches by arranging them in a tree-structure as explained with reference to FIG. 2. As a result, the total number of switches required is eight, and while somewhat more than the six required for the first embodiment explained with reference to FIG. 1, the tunable optical filter can still be made with only half of the sixteen switches required for the conventional example explained with reference to FIG. 18.

With the present third embodiment and the embodiments to be explained below, the same function can be obtained even if waveguides in the input waveguide group 23 connected to the first optical switch or the waveguides in the output waveguide group 27 connected to the second optical switch are shifted, as is the case with the first embodiment explained with reference to FIG. 1. That is, in the third embodiment explained with reference to FIG. 11 for example, the two output ports of the first optical switch 42 may be connected to waveguides 23 ($I_i$) and 23 ($I_{i+8}$) (wherein i is a natural number and $1 \leq i \leq 8$) instead of waveguides 23e (I5) and 23m (I13). Furthermore, if the arrayed-waveguide grating router 21 is periodic, then the range of the indices i may be widened to $1 \leq i \leq 16$, as is the case with the first embodiment.

Additionally, in the third embodiment shown in FIG. 11, the connections shown in FIG. 13 may also be used instead of the optical switch connection method explained with reference to FIG. 12.

[Fourth Embodiment]

Figure 14:
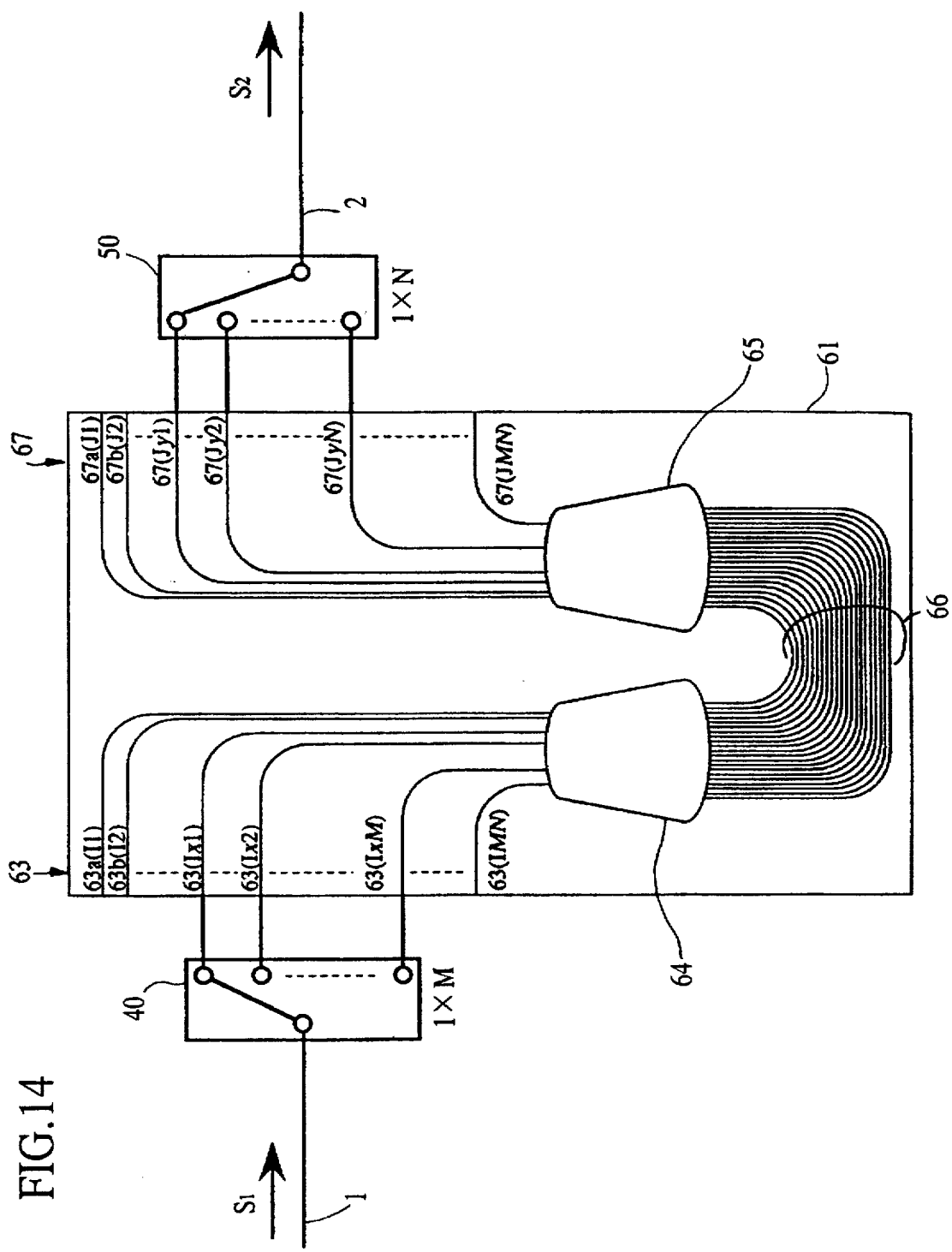
FIG. 14 is a structural diagram showing a tunable optical filter according to a fourth embodiment of the present invention.

FIG. 14 is a structural diagram showing a fourth embodiment of the tunable optical filter according to the present invention. The present fourth embodiment differs from the first embodiment explained with reference to FIG. 1 in that an arrayed-waveguide grating router 61 for M·N (wherein M and N are each natural numbers greater than or equal to 2) frequency-division-multiplexed channels is provided instead of the sixteen-channel arrayed-waveguide grating router 21, and an 1×M optical switch 40 and a 1×N optical switch 50 are provided in place of the 1×4 optical switches 44, 54 as the first and second optical switches. In accordance thereto, the M output ports of the first optical switch 40 are connected to waveguides 63 ($Ix_1$), 63 ($Ix_2$), ..., 63 ($Ix_M$) in the input waveguide group 63 of the arrayed-waveguide grating router 61, while the N input ports of the second optical switch 50 are connected to waveguides 67 ($Jy_1$), 67 ($Jy_2$), ..., 67 ($Jy_N$).

Next, the operations of the present fourth embodiment will be explained with reference to FIG. 15, while focusing on the parts which differ from the above-mentioned first embodiment.

The M·N channel arrayed-waveguide grating router 61 has the ability to multiplex or demultiplex M·N channels of frequency-division-multiplexed signal, similar to the sixteen-channel arrayed-waveguide grating router 21 explained with reference to FIG. 3. Therefore, it is possible to select an arbitrary optical signal from a multiplexed signal of a maximum of M~N channels if a 1×M optical switch 40 on the input waveguide side and a 1×N optical switch 50 on the output waveguide side are appropriately connected with the arrayed-waveguide grating router 61.

For this reason, as was explained with the first embodiment with reference to FIGS. 4, 7A, 7B, 8A, 8B and 8C, the M·N frequencies from $f_z$ to $f_{Z+M\cdot N}$ should be arranged in an orderly fashion within a M×N matrix. That is, as is indicated in FIGS. 7A, 7B, 8A, 8B and 8C by hatched regions or separated by hatched lines, 1×2, 1×4 or 2×2 block portions should be ordered in a periodic fashion. This is shown in abbreviated form in FIG. 15. FIG. 15 corresponds to FIGS. 4, 7A, 7B, 8A, 8B and 8C of the first embodiment, and shows the relationship between the M waveguides ($Ix_1$~$Ix_M$) in the input waveguide group 63 to which the frequency-division-multiplexed optical signal $S_1$ is inputted and the frequencies of the optical signals outputted to the N waveguides ($Jy_1$~$Jy_N$) in the output waveguide group 67.

Here, the possible combinations of the numbers $x_j$ ($1 \leq j \leq M$) and $y_j$ ($1 \leq j \leq N$) of the waveguides to which each optical switch is connected can be expressed in general form by the following equation. That is, the numbers $x_j$ and $y_j$ of the waveguides are natural numbers such that:

$$x_j = x + \sum_{i=0}^{r-1} (a_i - 1)p_iq_{i+1}, 1 \leq a_i \leq \frac{p_{i+1}}{p_i} \quad (1)$$

wherein x and $a_i$ (i=0, 1, ..., r-1) are natural numbers; and $$y_i = y + \sum_{i=0}^{r} (b_i - 1)p_iq_i, 1 \leq b_i \leq \frac{q_{i+1}}{q_i} \quad (2)$$

wherein y and $b_i$ (i=0, 1, ..., r) are natural numbers.

Here, $p_0, p_1, ..., p_r$ should be a series of numbers formed from r+1 different factors (r is a natural number) of M, wherein $p_0=1$, $p_r=M$, $p_k < p_{k+1}$ and $p_k$ is a factor of $p_{k+1}$ (k is either 0 or a natural number). Additionally, $q_0, q_1, ..., q_{r+1}$ should be a series of numbers formed from factors of N, wherein $q_0=1$, $q_{r+1}=N$, $q_k \leq q_{k+1}$ and $q_k$ is a factor of $q_{k+1}$ (k is either 0 or a natural number).

Figure 15:
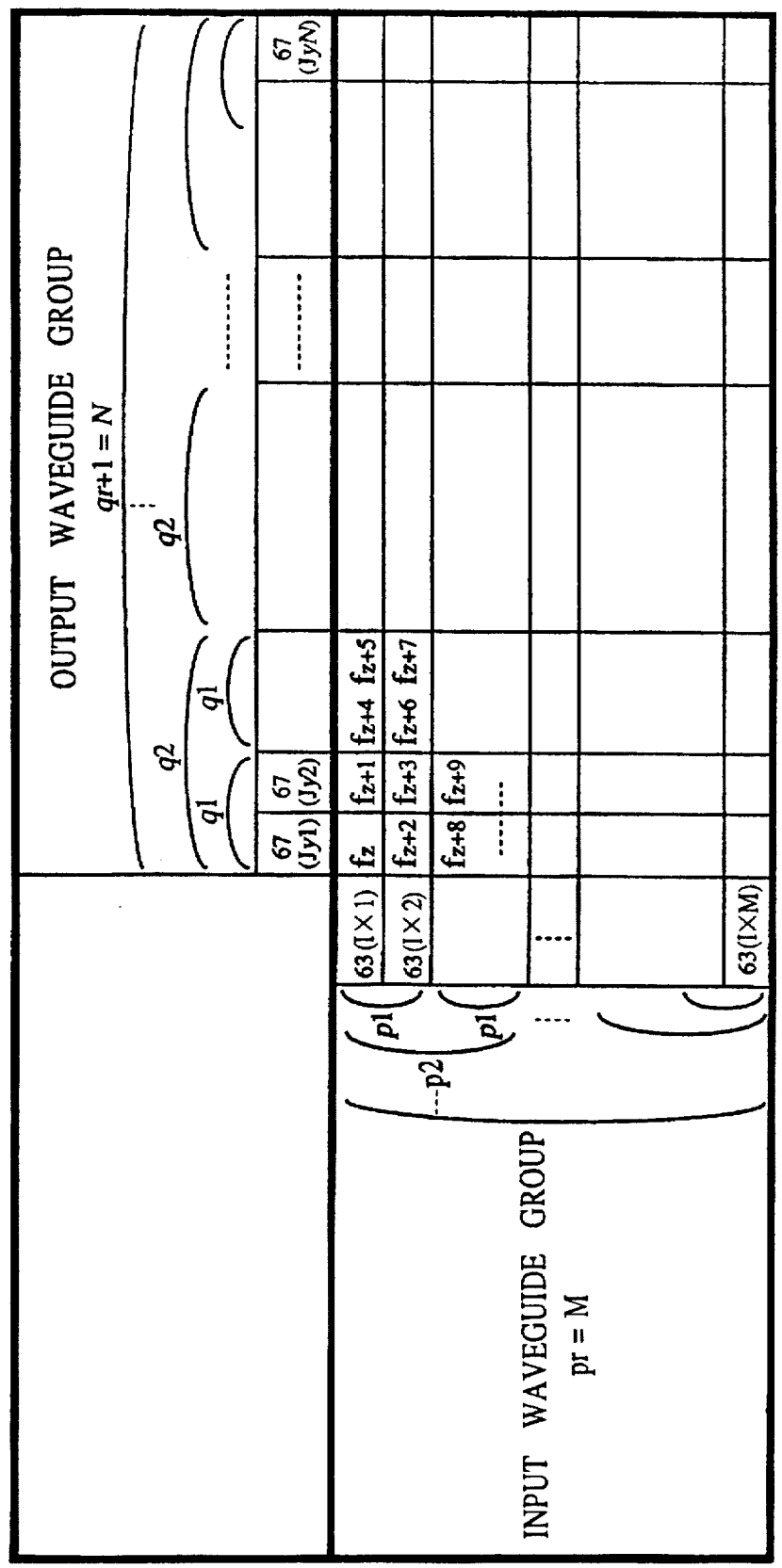
FIG. 15 is a diagram explaining the frequency selection operation of a fourth embodiment of the present invention.

In FIG. 15, pa×qb correspond to similar block portions as indicated in FIGS. 7A, 7B, 8A, 8B and 8C (a and b are natural numbers, pa and qb are respectively factors of M and N as defined above).

Consequently, by selecting the waveguides to connect with the optical switches using the above-given Equations (1) and (2), it is possible to construct a M·N channel tunable optical filter with a 1×M optical switch and a 1×N optical switch.

Hereinbelow, an example of the method of application of Equations (1) and (2) will be specifically explained for the case wherein M=N=4 (corresponding to the first embodiment). Since M=4=$2^2$ in this case, only the following two numerical series exist as the numerical series $P_n$ formed from different factors of M.

(A) $p_0=1$, $p_1=2$, $p_2=4$ (r=2)

(B) $p_0=1$, $p_1=4$ (r=1)

However, since (B) is a partial series of (A), it is only necessary to consider series (A) in practice.

With series (A), r=2, so the following six candidates exist for the numerical series $q_n$ formed from the factors of N.

(a) $q_0=1$, $q_1=1$, $q_2=1$, $q_3=4$ (b) $q_0=1$, $q_1=1$, $q_2=2$, $q_3=4$ (c) $q_0=1$, $q_1=1$, $q_2=4$, $q_3=4$ (d) $q_0=1$, $q_1=2$, $q_2=2$, $q_3=4$ (e) $q_0=1$, $q_1=2$, $q_2=4$, $q_3=4$ (f) $q_0=1$, $q_1=4$, $q_2=4$, $q_3=4$

Of these, if for example numerical series (d) is used, then by substituting (A) and (d) into Equations (1) and (2), the following equations are obtained:

$$x_j = x + (a_0 - 1)p_0q_1 + (a_1 - 1)p_1q_2 \quad (3)$$
$$= x + 2(a_0 - 1) + 4(a_1 - 1), \text{ wherein } a_0 = 1,2; a_1 = 1,2$$

In Equation (3), both $a_0$ and $a_1$ have two possible values, so four values x, x+2, x+4 and x+6 are obtained for $x_j$. In Equation (4), both $b_0$ and $b_2$ have two possible values while $b_1$ has one possible value, so four values y, y+1, y+8 and y+9 are obtained for $y_j$. These combinations of $x_j$ and $y_j$ correspond to the combinations shown in FIG. 8B, and it is thereby possible to select a single arbitrary channel from among a total of sixteen channels.

Alternatively, in the cases in which numerical series $q_n$ other than (d) among (a)–(f) are used, similar combinations of $x_j$ and $y_j$ can be obtained for each. These correspond to the remaining five combinations shown in FIGS. 4, 7A, 7B, 8A and 8C, and each also allows a single arbitrary channel to be selected from among a total of sixteen channels.

That is, by selecting the waveguides in the input waveguide group 63 and the output waveguide group 67 to connect to the first and second optical switches 40, 50 according to Equations (1) and (2), it is possible to select a single arbitrary optical signal $S_2$ from among a total of M·N channels in a frequency-division-multiplexed optical signal $S_1$ by combining a M·N channel arrayed-waveguide grating router 61 with a 1×M optical switch 40 and a 1×N optical switch 50.

Similar to the previous embodiments, the fourth embodiment shown in FIG. 14 also has low loss in comparison to the conventional example because the optical signal $S_2$ only passes through the arrayed-waveguide grating router 61 once. Furthermore, since 1×K optical switches (wherein K is a natural number) can generally be formed from about K 1×2 optical switches, the number of optical switches needed in the fourth embodiment is only (M+N). In contrast, the conventional example explained with reference to FIG. 18 requires M·N optical switches, rendering obvious the advantage in reduction of optical switches offered by the present embodiment.

Additionally, in the fourth embodiment shown in FIG. 14, the total number of optical switches can be held at a minimum if the numbers M and N of both first and second optical switches are made as close as possible to the value of $\sqrt{(M \cdot N)}$.

As was explained in detail above, it is possible to obtain a maximum of M·N possible frequency selection characteristics with the tunable optical filter of the present invention, depending upon the state of connection of the first and second optical switches. Additionally, the selected optical signal only makes a single passage through the arrayed-waveguide grating router 21 or 61 which is high in loss. As a result, it is possible to offer a tunable optical filter having low loss and a reduced number of optical switches used for performing digital operations.

[Fifth Embodiment]

Figure 16:
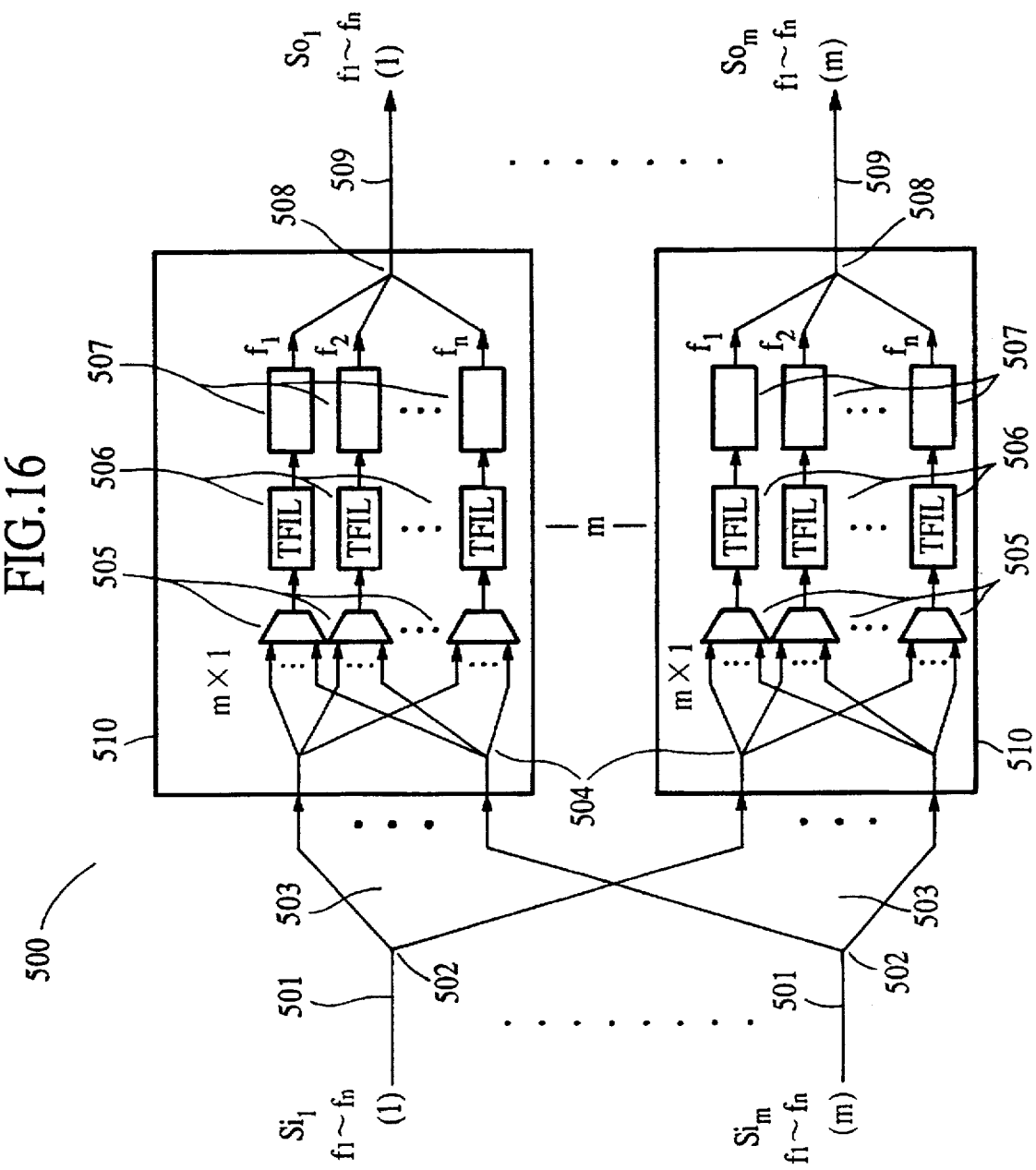
FIG. 16 is a structural diagram showing the structure of an optical cross-connect apparatus which is a suitable example of application of the tunable optical filter of the present invention.
Figure 17:
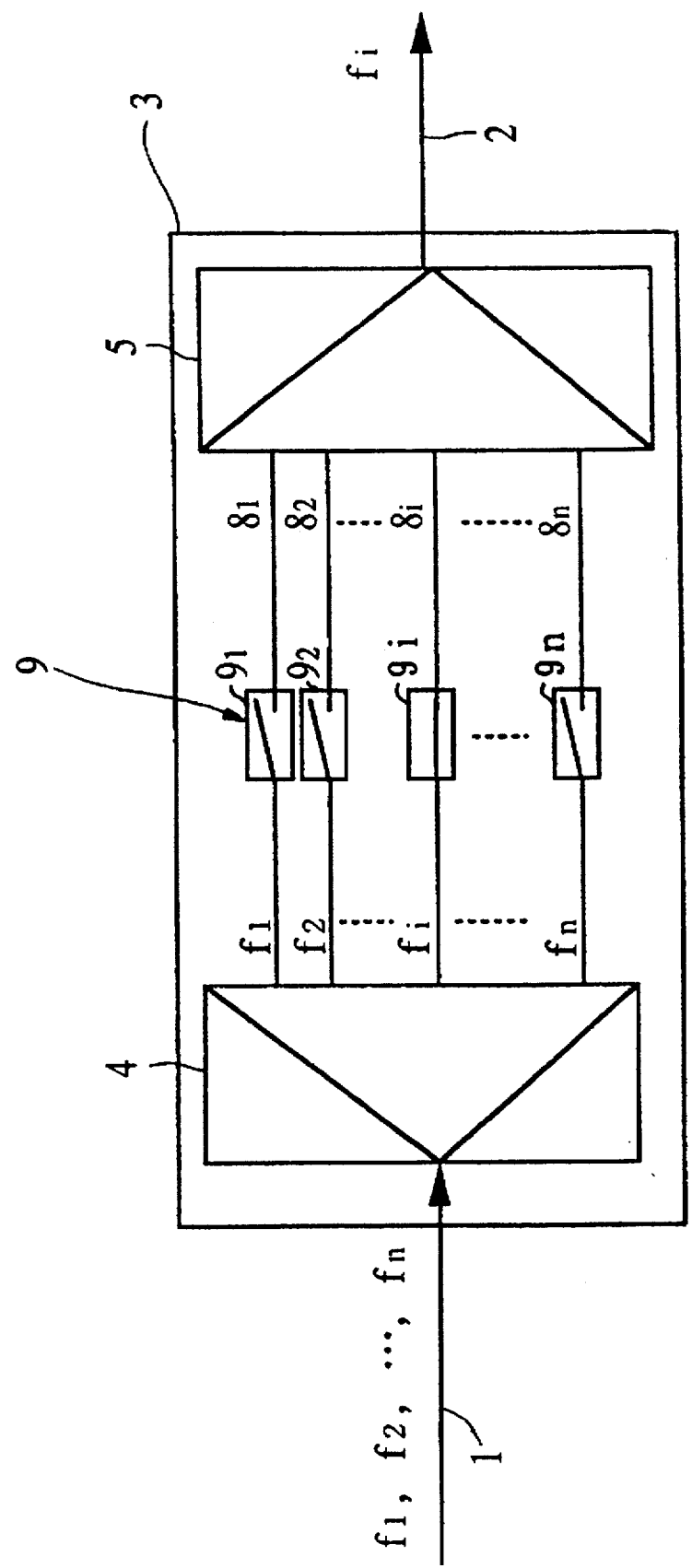
FIG. 17 is a diagram explaining the operating principles of a conventional tunable optical filter.

FIG. 16 shows the structure of an optical cross-connect apparatus which is an appropriate example of application of the tunable optical filter of the present invention. In this case, the optical cross-connect apparatus 500 shown in FIG. 16 comprises a plurality (m in this case) of beam splitters 502 which split m frequency-division-multiplexed (frequencies $f_1, \ldots, f_n$) input optical signals $Si_1, \ldots, Si_m$ which are respectively transmitted from m optical transmission routes 501 into m optical transmission routes 503; m multiple-input switches 510 each comprising m beam splitters 504, a plurality of m×1 optical switches 505, a plurality of tunable optical filters 506 according to the present invention as explained in the first through fourth embodiments, a plurality of frequency converters 507 which receive optical or electrical signals and output them with converted frequencies, and an optical multiplexer 508; and m optical transmission routes 509 respectively connected to the output terminals of the m multiple-input switches 510. This optical cross-connect apparatus 500 receives m·n optical signals in m input optical signals $Si_1, \ldots, Si_m$ whereinto optical signals of frequencies $f_1, \ldots, f_n$ have been multiplexed, and has the ability to cross-connect them into m output optical signals $So_1, \ldots, So_m$ in optical transmission routes 509. While this type of optical cross-connect apparatus requires a large number of tunable optical filters, the size of the apparatus can be markedly reduced by using the present invention, since the large number of required tunable optical filters can be achieved with a small number of optical switch elements.

The detailed operations of commonly-known optical cross-connect apparatus are explained in the following reference: "1990 International Optical Meeting on Photonic Switching, Lecture No. 14B-9(PD), Apr. 12–14, 1990, Kobe, Japan, Post-deadline Papers Technical Digest, pp. 10–12, 1990" (M. Nishio et al.)

I claim:

1. A tunable optical filter comprising:

an arrayed-waveguide grating router having an input waveguide group composed of M·N waveguides and an output waveguide group composed of M·N waveguides, wherein M and N are each natural numbers greater than or equal to two;

an input optical path;

an optical path connection means for connecting said input optical path with one of M waveguides labeled $x_j$ in said input waveguide group wherein j=1, 2, ..., M, and $x_j$ is defined by the following equation:

$$x_j = x + \sum_{i=0}^{r-1} (a_i - 1)p_i q_{i+1}, \quad 1 \leq a_i \leq \frac{p_{i+1}}{p_i}$$

wherein x and $a_i$ are natural numbers and i=0, 1, ..., r−1;

an optical path selection means for selecting one of N waveguides labeled $y_j$ in said output waveguide group wherein j=1, 2, ..., N, and $y_j$ is defined by the following equation:

$$y_j = y + \sum_{i=0}^{r} (b_i - 1)p_i q_i, \quad 1 \leq b_i \leq \frac{q_{i+1}}{q_i}$$

wherein y and $b_i$ are natural numbers and i=0, 1, ..., r; and numerical series $p_0, p_1, \ldots, p_r$ is composed of r+1 different factors of M such that $p_0=1$, $P_r=M$, $p_k < p_{k+1}$ and $P_k$ is a factor of $p_{k+1}$ and numerical series $q_0, q_1, \ldots, q_{r+1}$ is composed of r+2 factors of N such that $q_0=1$, $q_{r+1}=N$, $q_k \leq q_{k+1}$ and $q_k$ is a factor of $q_{k+1}$, wherein k is either zero or a natural number and r is a natural number.

2. A tunable optical filter comprising:

an arrayed-waveguide grating router, with a router connectivity which has a periodicity of M·N, having an input waveguide group composed of M·N waveguides and an output waveguide group composed of M·N waveguides, wherein M and N are each natural numbers greater than or equal to two;

an input optical path;

an optical path connection means for connecting said input optical path with one of M waveguides labeled $x'_j$ in said input waveguide group wherein j=1, 2, ..., M, and $x'_j$=1+Mod ($x_j$−1, M·N); and an optical path selection means for selecting one of N waveguides labeled $y'_j$ in said output waveguide group wherein $j=1, 2, \ldots, N$, and $y'_j=1+\text{Mod}(y_j-1, M \cdot N)$; wherein $$x_j = x + \sum_{i=0}^{r-1} (a_i - 1) p_i q_{i+1}, \quad 1 \leq a_i \leq \frac{p_{i+1}}{p_i}$$

wherein $x$ and $a_i$ are natural numbers and $i=0, 1, \ldots, r-1$;

$$y_j = y + \sum_{i=0}^{r} (b_i - 1) p_i q_i, \quad 1 \leq b_i \leq \frac{q_{i+1}}{q_i}$$

wherein $y$ and $b_i$ are natural numbers and $i=0, 1, \ldots, r$; and numerical series $p_0, p_1, \ldots, p_r$ is composed of $r+1$ different factors of M such that $P_0=1$, $P_r=M$, $P_k < P_{k+1}$ and $P_k$ is a factor of $P_{k+1}$ and numerical series $q_0, q_1, \ldots, q_{r+1}$ is composed of $r+2$ factors of N such that $q_0=1$, $q_{r+1}=N$, $q_k \leq q_{k+1}$ and $q_k$ is a factor of $q_{k+1}$ wherein k is either zero or a natural number and r is a natural number.

3. A tunable optical filter according to claim 1 or claim 2, wherein said arrayed-waveguide grating router is constructed such that at least one of the waveguides among said input waveguide group and said output waveguide group which are not connected to said optical connection means or said optical selection means is omitted.

* * * * *

UNITED STATES PATENT AND TRADEMARK OFFICE
CERTIFICATE OF CORRECTION

PATENT NO. : 5,701,371
DATED : December 23, 1997
INVENTOR(S) : Osamu ISHIDA

It is certified that error appears in the above-indentified patent and that said Letters Patent is hereby corrected as shown below:

Claim 1, column 14, line 49, "$P_r$" should read --$p_r$--.

Claim 1, column 14, line 50, "$P_k$" should read --$p_k$--.

Claim 2, column 16, line 2, "$P_o=1$, $P_r=M$, $P_k<P_{k+1}$" should read --$p_o=1$, $p_r=M$, $p_k<p_{k+1}$--.

Claim 2, column 16, line 3, "$P_k$" should read --$p_k$--; and "$P_{k+1}$" should read --$p_{k+1}$--.

Claim 2, column 16, line 5, "$q_{r+1=N}$" should read --$q_{r+1}=N$--; and "$qk \leq q_{k+1}$" should read --$q_k \leq q_{k+1}$--.

Signed and Sealed this

Twenty-ninth Day of September, 1998

Attest:

BRUCE LEHMAN

*Attesting Officer*      *Commissioner of Patents and Trademarks*